US012770429B2

(12) United States Patent
Agrawal et al.

(10) Patent No.: US 12,770,429 B2
(45) Date of Patent: Oct. 20, 2026

(54) IDENTIFYING RELEVANT FACES IN IMAGES FOR A USER

(71) Applicant: Motorola Mobility LLC, Chicago, IL (US)

(72) Inventors: Amit Kumar Agrawal, Bangalore (IN); Rahul Bharat Desai, Hoffman Estates, IL (US); Renuka Prasad Herur Rajashekaraiah, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 503 days.

(21) Appl. No.: 18/203,238

(22) Filed: May 30, 2023

(65) Prior Publication Data

US 2024/0404319 A1 Dec. 5, 2024

(51) Int. Cl.
*G06V 40/16* (2022.01)

(52) U.S. Cl.
CPC .................................. *G06V 40/172* (2022.01)

(58) Field of Classification Search
CPC .................................................... G06V 40/172
See application file for complete search history.

(56) References Cited

U.S. PATENT DOCUMENTS

2010/0172550 A1* 7/2010 Gilley .................. G11B 27/034 382/218
2015/0131872 A1* 5/2015 Ganong ............. G06Q 30/0241 382/118
2019/0163962 A1* 5/2019 Chan ..................... H04L 67/306

OTHER PUBLICATIONS

"Classifying the Image", Engineering Purdue [retrieved Apr. 25, 2023]. Retrieved from the Internet <https://engineering.purdue.edu/~abe305/HTMLS/sample8.htm>., 2 Pages.
Becker, Kory , "An Intelligent Approach to Image Classification by Color", Primary Objects [retrieved Apr. 25, 2023]. Retrieved from the Internet <https://www.primaryobjects.com/2013/06/17/an-intelligent-approach-to-image-classification-by-color/>., Jun. 17, 2013, 18 Pages.
Bhanot, Karan , "Color Identification in Images", Medium [retrieved Apr. 25, 2023]. Retrieved from the Internet <https://towardsdatascience.com/color-identification-in-images-machine-learning-application-b26e770c4c71>., Dec. 17, 2018, 17 Pages.
Dhakar, Lokesh , "Color Thief", Lokeshdhakar [retrieved Apr. 25, 2023]. Retrieved from the Internet <https://lokeshdhakar.com/projects/color-thief/>., 10 Pages.

(Continued)

*Primary Examiner* — Wassim Mahrouka
(74) *Attorney, Agent, or Firm* — FIG. 1 Patents

(57) ABSTRACT

Face profiles for multiple people associated with a user are obtained at a computing device. The face profile for a person identifies the face of the person (e.g., an image of the face of the person) and a confidence level indicating how important that person is to the owner. An image is captured at the computing device and a determination is made, based on a confidence level associated with at least one face in the image, whether the image is relevant to the user. One or more actions to keep the image are taken in response to determining that the image is relevant to the user, such as saving the image at the computing device or transmitting the image to a computing device of the user.

20 Claims, 9 Drawing Sheets

(56) References Cited

OTHER PUBLICATIONS

Gadgets 360 Staff , “Best Camera Mobile Phones”, Gadgets 360 [retrieved Apr. 25, 2023]. Retrieved from the Internet <https://www.gadgets360.com/mobiles/best-camera-phones>., 20 Pages.
Kolowich Cox, Lindsay , “Phone Photography 101: How to Take Good Pictures With Your Mobile Device”, HubSpot [retrieved Apr. 24, 2023]. Retrieved from the Internet <https://blog.hubspot.com/marketing/good-pictures-phone-tips>., Sep. 16, 2022, 17 Pages.

* cited by examiner

IDENTIFYING RELEVANT FACES IN IMAGES FOR A USER

BACKGROUND

As technology has advanced our uses for computing devices have expanded. One such use is digital photography. Many computing devices, such as mobile phones, include imaging devices allowing users to capture digital images. While many users enjoy the ability to capture digital images with their computing devices, current imaging devices are not without their problems. One such problem is that users oftentimes hand their computing device to another person and ask that other person to take a picture for the user. This can result in the other person taking pictures that are not in accordance with the preferences of the user.

BRIEF DESCRIPTION OF THE DRAWINGS

Embodiments of identifying relevant faces in images for a user are described with reference to the following drawings. The same numbers are used throughout the drawings to reference like features and components.

DETAILED DESCRIPTION

Figure 1:
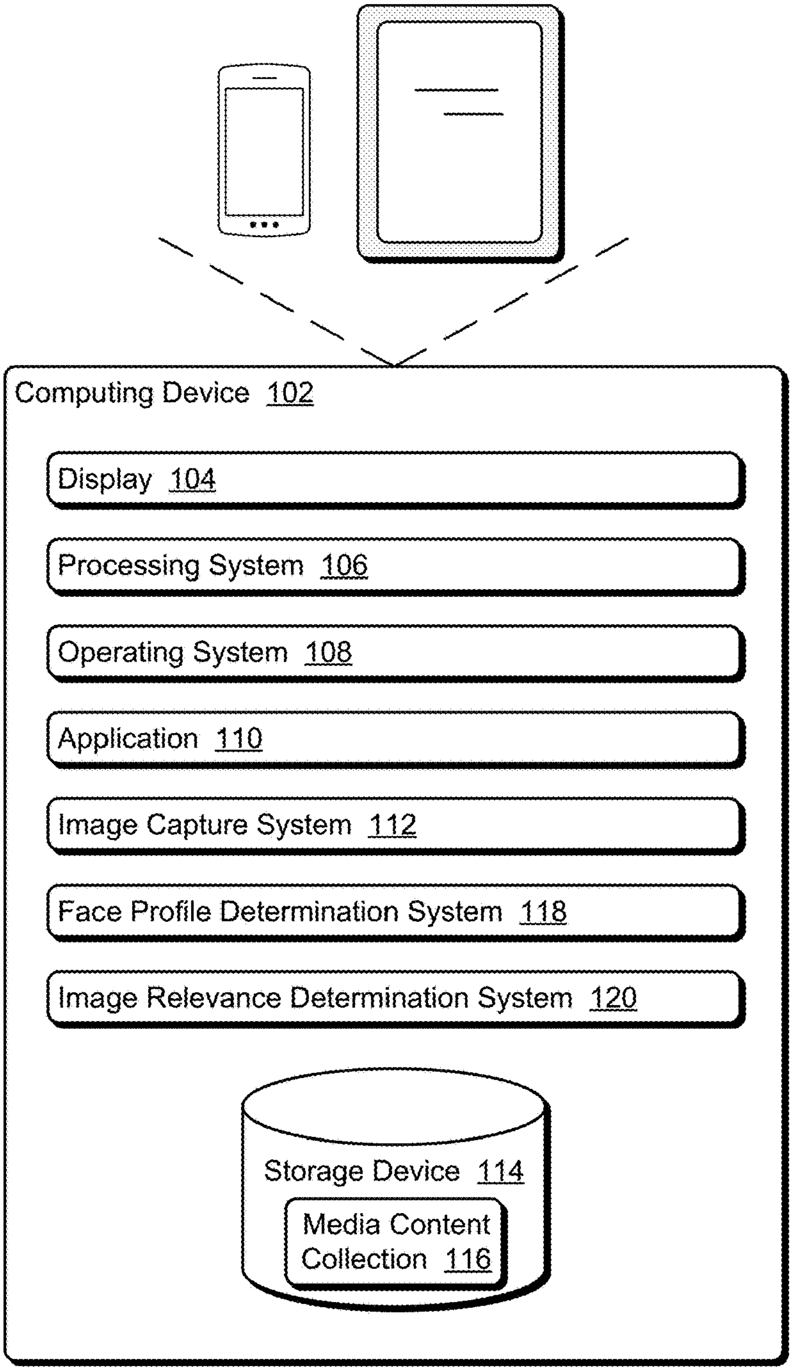
FIG. 1 illustrates an example computing device implementing the techniques discussed herein.

Identifying relevant faces in images for a user is discussed herein. Generally, face profiles for multiple people associated with an owner of a computing device are generated. The face profile for a person identifies the face of the person (e.g., an image of the face of the person) and a confidence level indicating how important that person is to the owner. Various different rules or criteria can be used to determine how important a person is to the owner, such as whether the person is included in a "favorites" list on the computing device, how many times the person's face appears in social media or in digital images saved on the phone, and so forth. The owner of the computing device refers to a primary user of the computing device. The owner of the computing device typically is a user that has an account on the device and can log into the device (e.g., with a password, fingerprint identification, face identification, etc.). The owner of the computing device typically is, but need not be, the purchaser of the device (e.g., a parent may pay for a computing device for their child, and the child is the primary user of the computing device and thus is referred to as the owner herein).

In one or more implementations, the owner of the computing device hands the computing device to another user, such as a family member or friend, to capture images for the owner. For example, the owner may be at a social event, such as a wedding, and hand their phone to a friend to capture some images for the owner. The friend captures several images and for each image the computing device identifies faces in the image and, based on the face profiles, the confidence levels of those faces. If the confidence levels of one or more faces are high enough (e.g., greater than a threshold) or there are at least a threshold number of faces in the image with a high confidence level, the computing device keeps the image. Otherwise, the computing device can delete the image.

Additionally or alternatively, the computing device transmits the face profiles generated for the owner's computing device to the computing devices of one or more other users. For example, the owner may be at a social event, such as a wedding, and has their computing device transmit the face profiles to the computing device of one or more family members or friends. Those family members or friends capture several images with their own computing devices, and for each such image the computing device that captured the image identifies faces in the image and the confidence levels of those faces based on the face profiles from the owner's computing device. If the confidence levels of one or more faces are high enough (e.g., greater than a threshold), or there are at least a threshold number of faces in the image with a high confidence level, the computing device transmits the captured image to the owner (e.g., to the owner's computing device, to a cloud store associated with the owner). Otherwise, the computing device need not transmit the captured image to the owner.

The techniques discussed herein allow a computing device to automatically determine which captured images are most likely to be important to a particular user (e.g., the owner of the computing device or the owner of another computing device). This conserves resources (e.g., storage or bandwidth) because images that are not likely to be important to the user can be deleted or not transferred to the owner.

FIG. 1 illustrates an example computing device 102 implementing the techniques discussed herein. The computing device 102 can be, or include, many different types of computing or electronic devices. For example, the computing device 102 can be a smartphone or other wireless phone, a camera (e.g., compact or single-lens reflex), or a tablet or phablet computer. By way of further example, the computing device 102 can be a notebook computer (e.g., netbook or ultrabook), a laptop computer, a wearable device (e.g., a smartwatch, an augmented reality headset or device, a virtual reality headset or device), a personal media player, a personal navigating device (e.g., global positioning system), an entertainment device (e.g., a gaming console, a portable gaming device, a streaming media player, a digital video recorder, a music or other audio playback device), a video camera, an Internet of Things (IoT) device, an automotive computer, and so forth.

The computing device 102 includes a display 104. The display 104 can be configured as any suitable type of display, such as an organic light-emitting diode (OLED) display, active matrix OLED display, liquid crystal display (LCD), in-plane shifting LCD, projector, and so forth. Although illustrated as part of the computing device 102, it should be noted that the display 104 can be implemented separately from the computing device 102. In such situations, the computing device 102 can communicate with the display 104 via any of a variety of wired (e.g., Universal Serial Bus (USB), IEEE 1394, High-Definition Multimedia Interface (HDMI)) or wireless (e.g., Wi-Fi, Bluetooth, infrared (IR)) connections. The display 104 can also optionally operate as an input device (e.g., the display 104 can be a touchscreen display).

The computing device 102 also includes a processing system 106 that includes one or more processors, each of which can include one or more cores. The processing system 106 is coupled with, and may implement functionalities of, any other components or modules of the computing device 102 that are described herein. In one or more embodiments, the processing system 106 includes a single processor having a single core. Alternatively, the processing system 106 includes a single processor having multiple cores or multiple processors (each having one or more cores).

The computing device 102 also includes an operating system 108. The operating system 108 manages hardware, software, and firmware resources in the computing device 102. The operating system 108 manages one or more applications 110 running on the computing device 102, and operates as an interface between applications 110 and hardware components of the computing device 102.

The computing device 102 also includes an image capture system 112. The image capture system 112 captures images digitally using any of a variety of different technologies, such as a charge-coupled device (CCD) sensor, a complementary metal-oxide-semiconductor (CMOS) sensor, combinations thereof, and so forth. The image capture system 112 can include a single sensor and lens, or alternatively multiple sensors or multiple lenses. For example, the image capture system 112 may have at least one lens and sensor positioned to capture images from the front of the computing device 102 (e.g., the same surface as the display is positioned on), and at least one additional lens and sensor positioned to capture images from the back of the computing device 102.

The image capture system 112 can capture still images as well as video. The media content discussed herein refers to one or both of still images and video. The captured images or video are stored in a storage device 114 as a media content collection 116. The storage device 114 can be implemented using any of a variety of storage technologies, such as magnetic disk, optical disc, Flash or other solid state memory, and so forth.

In one or more implementations, the image capture system 112 senses and displays frames of video, also referred to as preview frames, at a particular rate (e.g., 30 or 60 images or frames per second). The preview frames provide the user an indication of the scene that the image capture system 112 will capture and store (e.g., in the storage device 114 or cloud storage) if requested, such as by user input to the computing device 102 to capture an image (e.g., user selection of a button on the computing device 102). The preview frames are displayed, for example, on the display 104 (e.g., a viewfinder of the computing device 102).

The computing device 102 also includes a face profile determination system 118 and an image relevance determination system 120. Each of the face profile determination system 118 and the image relevance determination system 120 can be implemented in a variety of different manners. For example, one or both of the systems 118 and 120 can be implemented as multiple instructions stored on computer-readable storage media and that can be executed by the processing system 106. Additionally or alternatively, one or both of the systems 118 and 120 can be implemented at least in part in hardware (e.g., as an application-specific integrated circuit (ASIC), a field-programmable gate array (FPGA), an application-specific standard product (ASSP), a system-on-a-chip (SoC), a complex programmable logic device (CPLD), and so forth). One or both of the systems 118 and 120 can be implemented in the same manner, or the systems 118 and 120 can each be implemented in a different manner. Furthermore, although illustrated as separate from the operating system 108, one or both of the face profile determination system 118 and the image relevance determination system 120 can be implemented at least in part as part of the operating system 108.

Generally, the face profile determination system 118 determines a face profile for each of multiple people associated with an owner of the computing device 102. The face profile for a person is generated by extracting data from images accessible to the computing device 102. The face profile for a person identifies the face of the person (e.g., an image of the face of the person, a vector representing the face of the person) and a confidence level indicating how important that person is to the owner of the computing device 102. This confidence level for a person is an indication of how likely the owner is to want to have images captured that include the person. Various different rules or criteria can be used to determine how important a person is to the owner, such as whether the person is included in a "favorites" list on the computing device, how many times the person's face appears in social media or in digital images saved on the phone, and so forth.

The image relevance determination system 120 analyzes images captured by the image capture system 112 and, based on the face profiles generated by the face profile determination system 118, determines a relevance of each captured image. Various rules or criteria can be used to determine the relevance of an image, such as whether the confidence levels of faces in the image are high enough (e.g., greater than a threshold) or there are at least a threshold number of faces in the image with a high confidence level (a confidence level greater than a threshold confidence level). The image relevance determination system 120 can take various actions if the image is determined to be relevant, such as storing the image (e.g., in the storage device 114 or a cloud storage device) or transmitting the image to another device.

Although the computing device 102 is illustrated as including both the face profile determination system 118 and the image relevance determination system 120, in one or more implementations the computing device 102 may only include one of systems 118 and 120. For example, the face profile determination system 118 may be located in a remote device, such as a server in the cloud. By way of another example, the computing device 102 may receive the face profiles from another device, in which case the computing device 102 need not include the face profile determination system 118.

Figure 2:
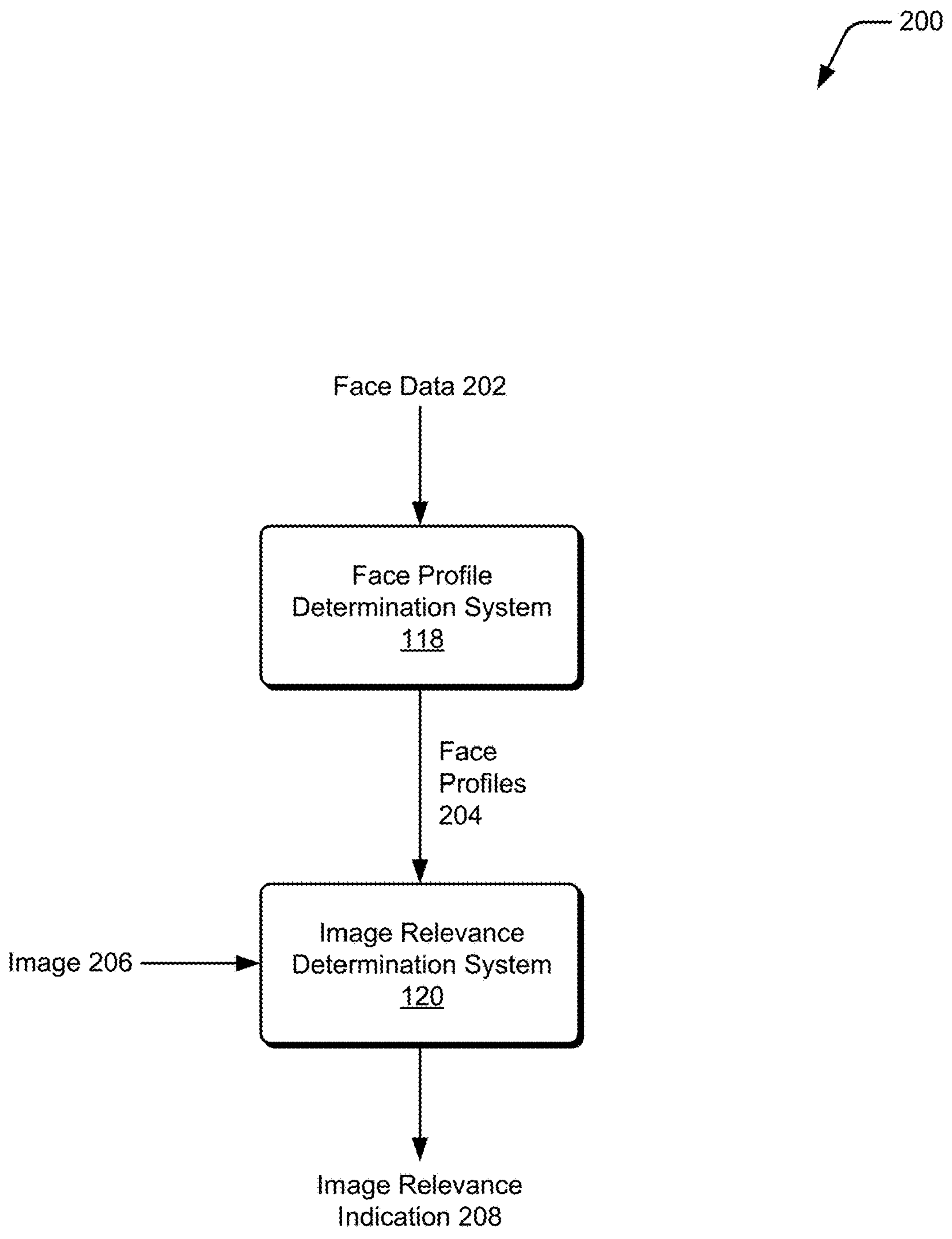
FIG. 2 illustrates an example system implementing the techniques discussed herein.

FIG. 2 illustrates an example system 200 implementing the techniques discussed herein. The system 200 includes the face profile determination system 118 and the image relevance determination system 120. The face profile determination system 118 receives face data 202 that includes faces for multiple people associated with the owner of the computing device 102. In one or more implementations, a person is associated with the owner of the computing device 102 if the person (e.g., an image of the person or other information identifying the person) is included in a device profile for the computing device 102. The device profile can include various data sources, such as a contacts list (e.g., including email addresses and phone numbers of people), a favorites list (e.g., favorite people in the contacts list), one or more social media accounts, images stored on the computing device 102, images stored on a remote device (e.g., in the cloud) in an account of the owner's that is accessible to the computing device 102, and so forth. Accordingly, the face data 202 can be images from the one or more social media accounts of the owner, images from the owner's contacts list on the computing device 102, and so forth.

The face profile determination system 118 analyzes the faces in face data 202 and generates a face profile for each person. The face profile identifies the face of the person in various manners, such as by including an image of the face of the person, including a vector representing the face of the person, and so forth. Each face profile also includes a confidence level indicating how important that person is to the owner of the computing device 102 or how relevant the face of that person is to the owner of the computing device 102.

The face profile determination system 118 can identify the faces in face data 202 using any of a variety of techniques. In one or more implementations, the face profile determination system 118 includes a machine learning system that identifies faces in the face data 202. A machine learning system refers to a computer representation that can be tuned (e.g., trained) based on inputs to approximate unknown functions. In particular, machine learning systems can include a system that uses algorithms to learn from, and make predictions on, known data by analyzing the known data to learn to generate outputs that reflect patterns and attributes of the known data. For instance, a machine learning system can include decision trees, support vector machines, linear regression, logistic regression, Bayesian networks, random forest learning, dimensionality reduction algorithms, boosting algorithms, artificial neural networks, deep learning, and so forth. The machine learning system can be trained to perform various tasks, such as to detect people's faces.

In one or more implementations, the face profiles also include additional information, such as a time (e.g., time of day or day of week) corresponding to the face, geographic information corresponding to the face, and so forth. This information can be obtained from metadata associated with the face. For example, when an image including a face is captured and stored, posted to social media, or included in a contacts list, metadata for the image oftentimes indicates various information, such as a time that the image was captured, a geographic location where the image was captured, and so forth. Any of this metadata for the image can be included in the face profile for a face included in the image.

The face profile determination system 118 determines the confidence level for a face using any of variety of different rules or criteria. In one or more implementations, the confidence level is based on how many times the face appears in the face data 202 (e.g., in social media, in images stored on the computing device 102, in a contacts list). For example, faces that appear more times in the face data 202 are assigned confidence levels higher than faces that appear fewer times in the face data 202.

Additionally or alternatively, the confidence level is based on where the face was obtained from (e.g., social media, images stored on the computing device 102, a contacts list, a favorites list). For example, faces that appear in a favorites list are assigned confidence levels higher than faces that are not in the favorites list but are in images stored on the computing device 102. By way of another example, faces that appear in a contacts list are assigned confidence values higher than faces that are not in the contacts list but are in social media. By way of another example, faces that appear in images stored on the computing device 102 are assigned confidence values higher than faces that are not in images stored on the computing device 102 but are in social media.

Additionally or alternatively, the confidence level may be a number of points or score generated based on how many times and where the face appears. For example, the score may be incremented by 25 points if the face is in a favorites list, incremented by 10 points if the face is in a contacts list but not in the favorites list, and incremented 1 point for each time the face appears in an image stored on the computing device or in social media.

Additionally or alternatively, the confidence level may be based on a current time or location. As discussed above, face profiles can include a time or geographic information. Those times or geographic locations may be associated with particular areas or ranges. For example, faces captured at the office during normal working hours may be considered work friends, while faces captured at home or during non-working hours may be considered personal friends or family. Accordingly, the confidence level may change for different faces based on where or when the image 206 is captured and where or when the images that include the face data 202 were captured. For example, if the images that include the face data 202 were captured during work hours at the owner's place of work the face is assigned a higher confidence value if the image 206 is captured during work hours and at the owner's place of work, and a lower confidence value if the image 206 is captured during non-work hours or not at the owner's place of work.

The face profile determination system 118 provides the face profiles generated based on the face data 202 to the image relevance determination system 120 as face profiles 204. The image relevance determination system 120 receives the face profiles 204 and an image 206, and generates an image relevance indication 208. The image 206 is, for example, an image captured by the image capture system 112 of FIG. 1.

The image relevance determination system 120 identifies one or more faces in the image 206 using any of a variety of face detection techniques. In one or more implementations, image relevance determination system 120 uses the same machine learning system as the face profile determination system 118 to identify faces.

The image relevance determination system 120 identifies a confidence level for each face in the image 206 by matching the face in the image 206 to a face identified in the face profiles 204 (by determining whether the face in the image 206 and the face identified in the face profiles 204 are of the same person). The image relevance determination system 120 identifies matching faces using any of a variety of techniques. In one or more implementations, the image relevance determination system 120 identifies matching faces using a machine learning system trained to determine whether two faces are the same person. Additionally or alternatively, the image relevance determination system 120 determines a distance between a vector representing the face in the image 206 and a vector in a face profile 204. If the distance between the vectors is less than a threshold amount the image relevance determination system 120 determines that the faces represented by the two vectors are of the same person.

If the image relevance determination system 120 determines that a face in the image 206 and a face in a face profile 204 are the same person, the image relevance determination system 120 uses the confidence level in the face profile 204 to determine the image relevance indication 208. If the image relevance determination system 120 determines that a face in the image 206 and a face in a face profile 204 are not the same person, the image relevance determination system 120 uses a low confidence level (e.g., zero or zero percent) to determine the image relevance indication 208.

The image relevance determination system 120 uses the confidence levels obtained for the faces in the image 206 to determine the image relevance indication 208. The image relevance indication 208 indicates that the image 206 is relevant or not relevant to the owner of the computing device 102. The image relevance determination system 120 determines the image relevance indication 208 using any of a variety of different rules or criteria. In one or more implementations, the image relevance determination system 120 determines that if the confidence level of at least a threshold number of faces (e.g., 1 or 2 faces) in the image 206 is above a threshold amount, the image is relevant. Additionally or alternatively, the image relevance determination system 120 determines that if the combined (e.g., summed or averaged) confidence levels of the faces in the image 206 are above a threshold amount, the image is relevant. Otherwise, the image relevance determination system 120 determines that the image 206 is not relevant.

In one or more implementations, the image relevance determination system 120 outputs the image relevance indication 208 to another application or system (e.g., an application 110 that is a camera application, a program of the operating system 108, the image capture system 112). The other application or system can then take one or more actions based on the image relevance indication 208. Additionally or alternatively, the image relevance determination system 120 takes one or more actions based on the image relevance indication 208. These one or more actions can include, for example, saving the image 206 if the image relevance indication 208 indicates that the image is relevant, transmitting the image 206 to another device if the image relevance indication 208 indicates that the image is relevant, and deleting the image 206 if the image relevance indication 208 indicates that the image is not relevant.

Additionally or alternatively, these one or more actions can include displaying, on one or more preview frames (e.g., in a viewfinder), an indication of the faces having a high confidence level (e.g., a confidence level above a threshold value). This indication can take various forms, such as surrounding the face in a preview image with a square or other geometric shape. Displaying an indication of the faces having a high confidence level gives the person using the computing device 102 an indication of which people to include in images being captured. This allows, for example, a person using the computing device 102 to capture an image only if there is at least a threshold number of persons (e.g., one or whatever threshold number the person using the computing device 102 decides) included in one or more preview frames.

Figure 3:
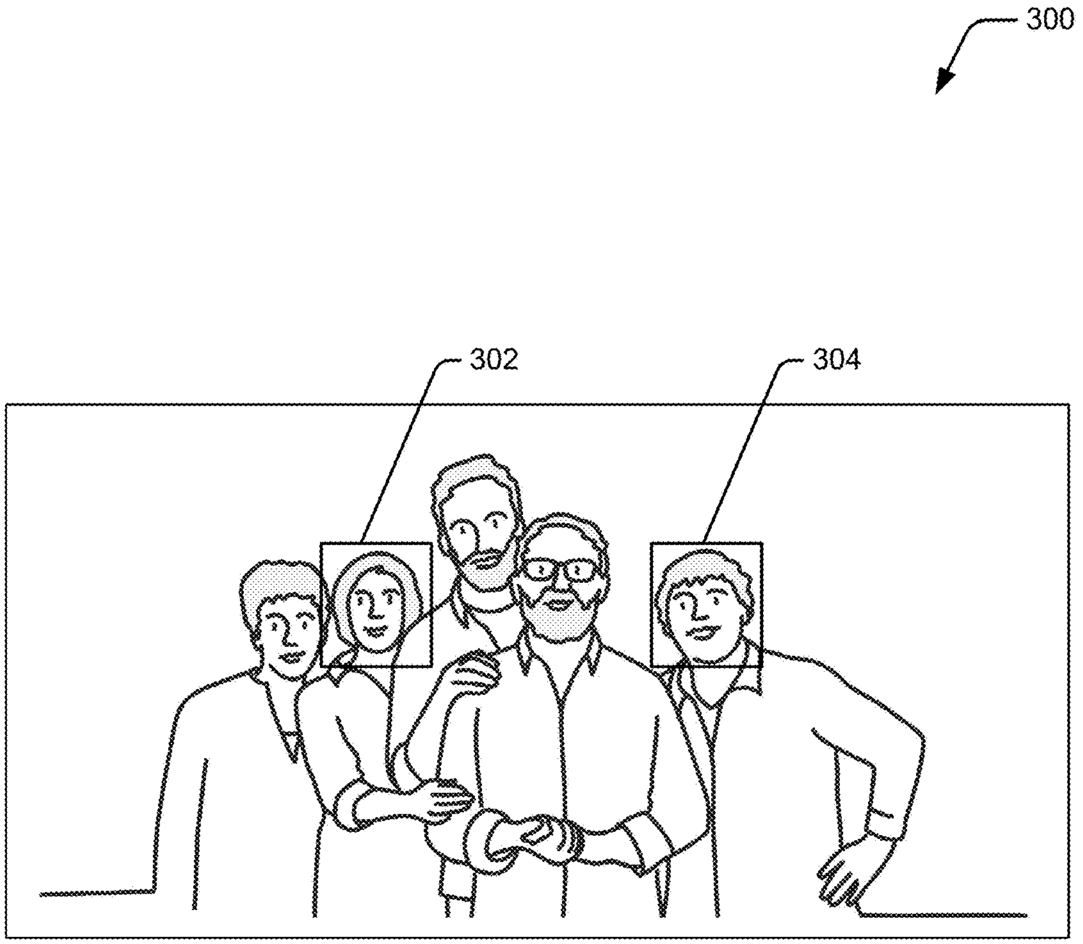
FIG. 3 illustrates an example preview frame using the techniques discussed herein.

FIG. 3 illustrates an example preview frame 300 using the techniques discussed herein. The preview frame 300 includes several people, two of which have faces with high confidence levels (e.g., confidence levels above a threshold value). The faces with high confidence levels are indicated as being surrounded by boxes 302 and 304 in FIG. 3. The person using the computing device 102 can thus readily see that if they were to capture the image displayed in the preview frame 300, the captured image would include two faces with high confidence levels.

Figure 4:
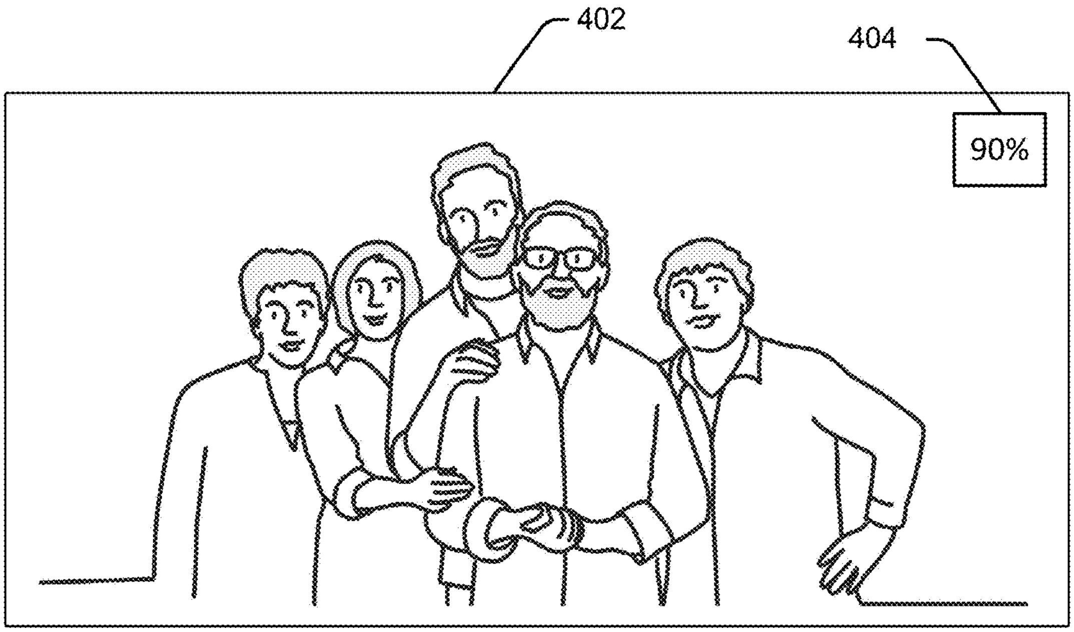
FIG. 4 illustrates additional example preview frames using the techniques discussed herein.
Figure 4:
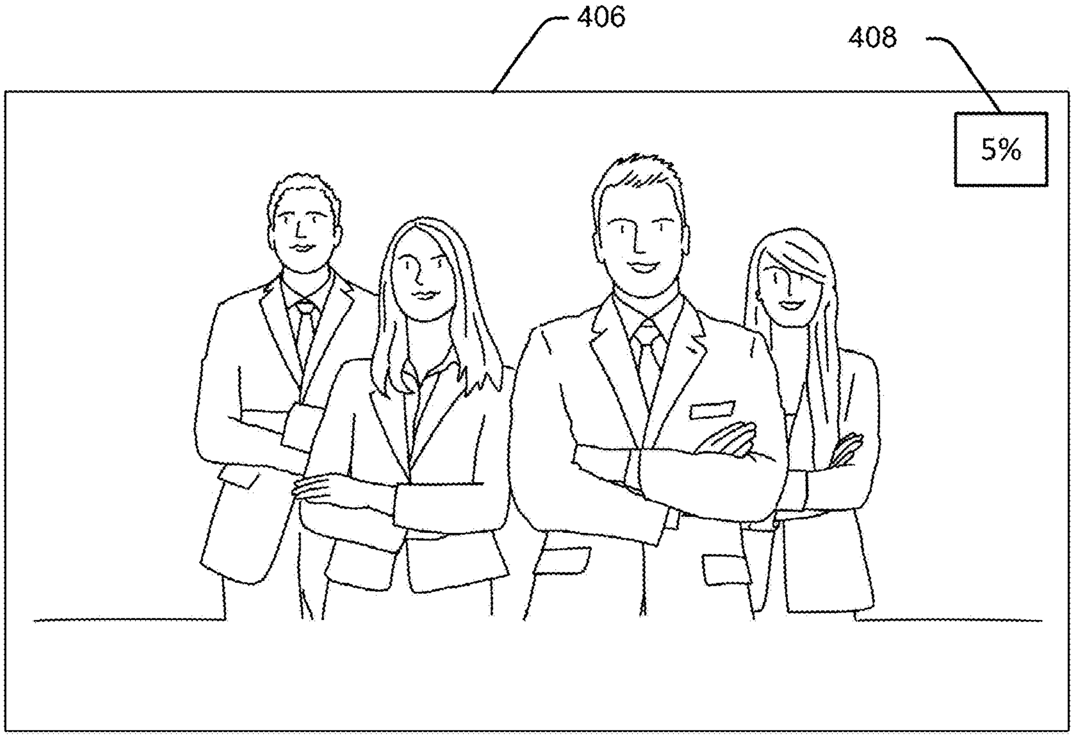

FIG. 4 illustrates additional example preview frames using the techniques discussed herein. The preview frame 402 includes several people and the image relevance determination system 120 of FIG. 2 determines a confidence level of the preview frame 402 (e.g., a combination (such as a sum or average) of confidence levels of the faces in the preview frame 402). The confidence level 404, which is 90% as illustrated, is displayed overlaying the preview frame 402. The person using the computing device 102 can thus readily see that if they were to capture the image displayed in the preview frame 402, the captured image would have a high confidence level that the captured image is relevant. It should be noted that in this example the user of the computing device 102 need not know which faces in the preview frame 402 resulted in the high confidence level.

The preview frame 406 includes multiple people and the image relevance determination system 120 of FIG. 2 determines a confidence level of the preview frame 406 (e.g., a combination (such as a sum or average) of confidence levels of the faces in the preview frame 406). The confidence level 408, which is 5% as illustrated, is displayed overlaying the preview frame 406. The person using the computing device 102 can thus readily see that if they were to capture the image displayed in the preview frame 406, the captured image would have a low confidence level that the captured image is relevant.

Returning to FIG. 2, the face profile determination system 118 and the image relevance determination system 120 support various different usage scenarios. In one or more implementations, the owner of the computing device 102 shares the computing device 102 with another user. For example, the owner of the computing device 102 may hand the computing device 102 to a friend or family member at an event such as a wedding, an awards ceremony, and so forth. In this situation the friend or family member may not be aware of which other people at the event are most important to or relevant to the owner of the computing device 102. Thus, the friend or family member may capture numerous images but the computing device 102 only saves those images that the image relevance indication 208 indicates are relevant. Other images may, for example, be deleted automatically.

Additionally or alternatively, the owner of the computing device 102 shares the face profiles 204 with other users' computing devices. This allows other users to capture images at an event, such as a wedding, awards ceremony, and so forth, and automatically transmit those images that are relevant to the owner of the computing device 102 to the computing device 102.

Figure 5:
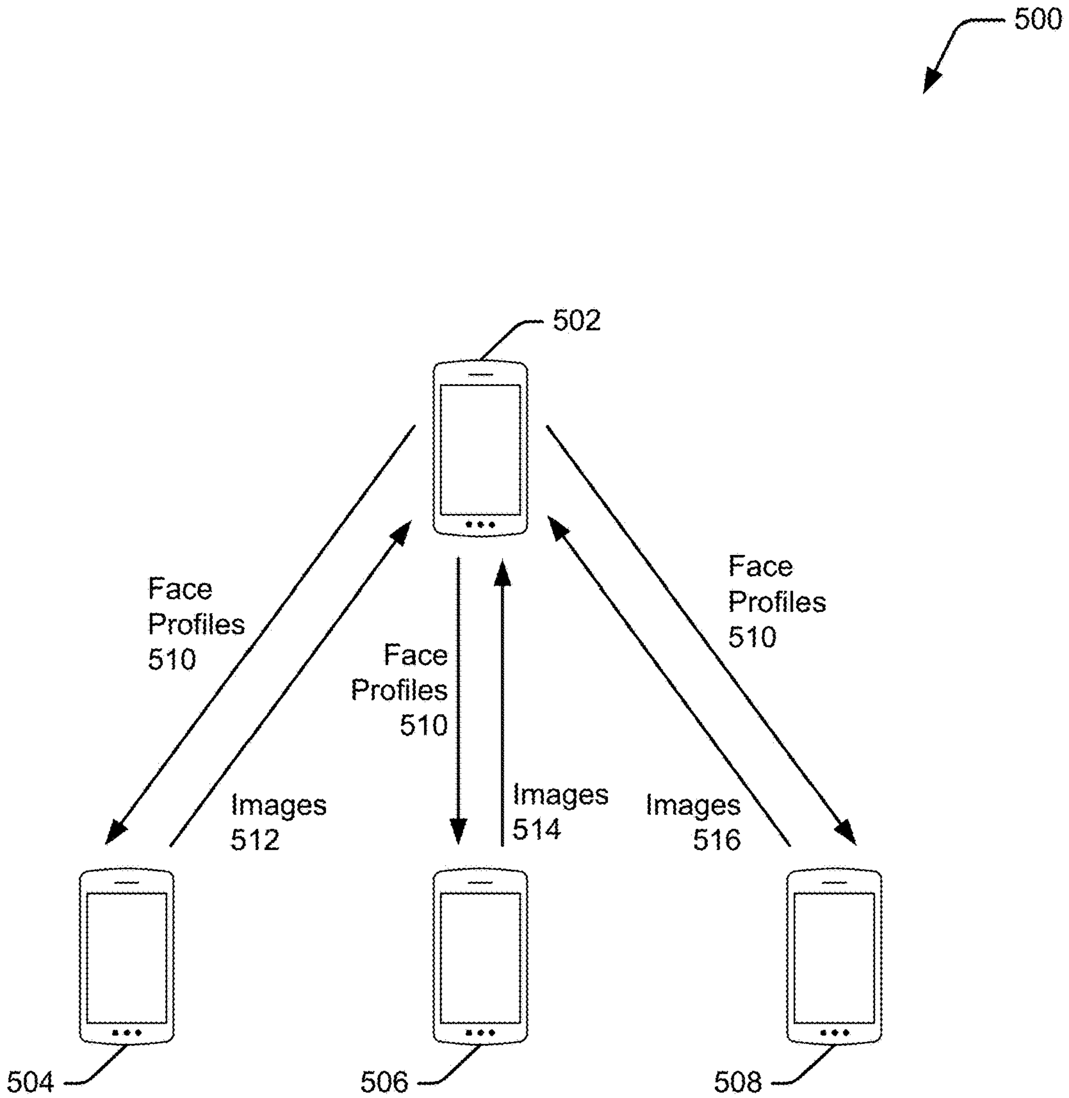
FIG. 5 illustrates an example usage scenario implementing the techniques discussed herein.

FIG. 5 illustrates an example usage scenario 500 implementing the techniques discussed herein. The usage scenario 500 illustrates a computing device 502, a computing device 504, a computing device 506, and a computing device 508. Face profiles 510 generated by a face profile determination system 118 (e.g., at the computing device 502) for the owner of the computing device 502 are transmitted to each of the computing devices 504, 506, and 508. The user of computing device 504 captures numerous images and an image relevance determination system 120 at the computing device 504 determines, based on the face profiles 510, which images 512 captured at the computing device 504 are relevant for the owner of the computing device 502. The computing device 504 transmits those images 512 that are relevant for the owner of the computing device 502 to the computing device 502.

Similarly, the user of computing device 506 captures numerous images and an image relevance determination system 120 at the computing device 506 determines, based on the face profiles 510, which images 514 captured at the computing device 506 are relevant for the owner of the computing device 502. The computing device 506 transmits those images 514 that are relevant for the owner of the computing device 502 to the computing device 502.

Similarly, the user of computing device 508 captures numerous images and an image relevance determination system 120 at the computing device 508 determines, based on the face profiles 510, which images 516 captured at the computing device 508 are relevant for the owner of the computing device 502. The computing device 508 transmits those images 516 that are relevant for the owner of the computing device 502 to the computing device 502.

Thus, multiple people can be capturing images at an event and those images that are relevant to the owner of the computing device 502 are automatically transmitted to the owner of the computing device 502. The users of the other computing devices 504, 506, and 508 need not have any knowledge of which images where actually transmitted from their computing devices to the computing device 502.

Although the usage scenario 500 illustrates face profiles 510 being transmitted to the computing devices 504, 506, and 508, and images being transmitted to the computing device 502, one or more other computing devices may transmit face profiles and receive images based on those face profiles. For example, the computing device 506 can transmit face profiles generated by a face profile determination system 118 (e.g., at the computing device 506) for the owner of the computing device 506 to each of the computing devices 502, 504, and 508. The users of computing devices 502, 504, and 508 capture numerous images and image relevance determination systems 120 at the respective computing devices 502, 504, and 508 determine which images captured at the computing devices 502, 504, and 508 are relevant for the owner of the computing device 506. The computing devices 502, 504, and 508 transmits those images 512 that are relevant for the owner of the computing device 502 to the computing device 506.

Figure 6:
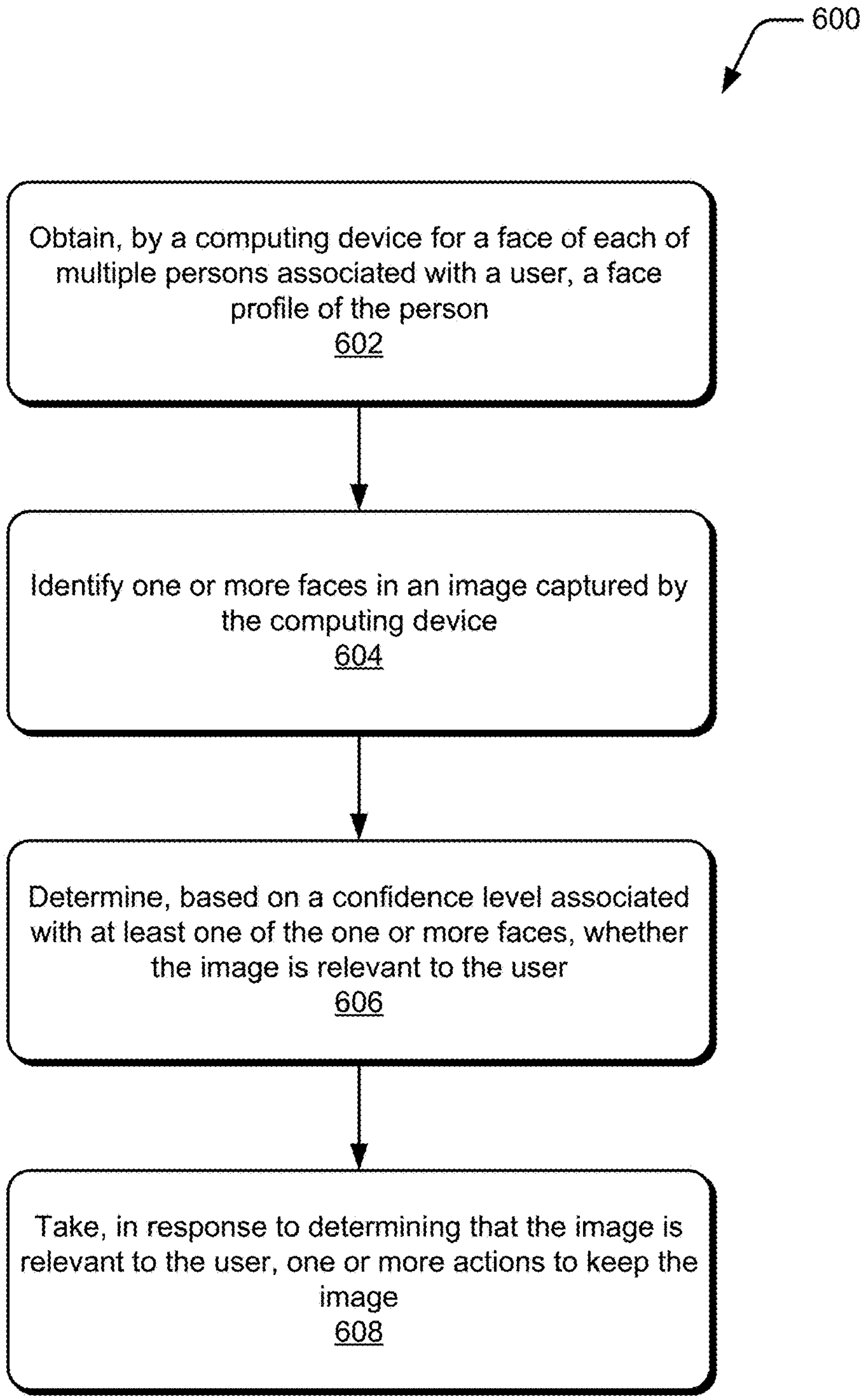
FIGS. 6, 7, and 8 illustrate example processes for implementing the techniques discussed herein in accordance with one or more embodiments.

FIG. 6 illustrates an example process 600 for implementing the techniques discussed herein in accordance with one or more embodiments. Process 600 is carried out at least in part by an image relevance determination system, such as image relevance determination system 120 of FIG. 1 or FIG. 2.

In process 600, a computing device obtains, for a face of each of multiple persons associated with a user, a face profile of the person (act 602). The computing device may generate the face profile or receive the face profile from another computing device or service.

One or more faces in an image captured by the computing device are identified (act 604).

A determination is made, based on a confidence level associated with at least one of the one or more faces, whether the image is relevant to the user (act 606).

One or more actions to keep the image are taken in response to determining that the image is relevant to the user (act 608). These one or more actions may be, for example, saving the image at the computing device or transmitting the image to a computing device of the user.

Figure 7:
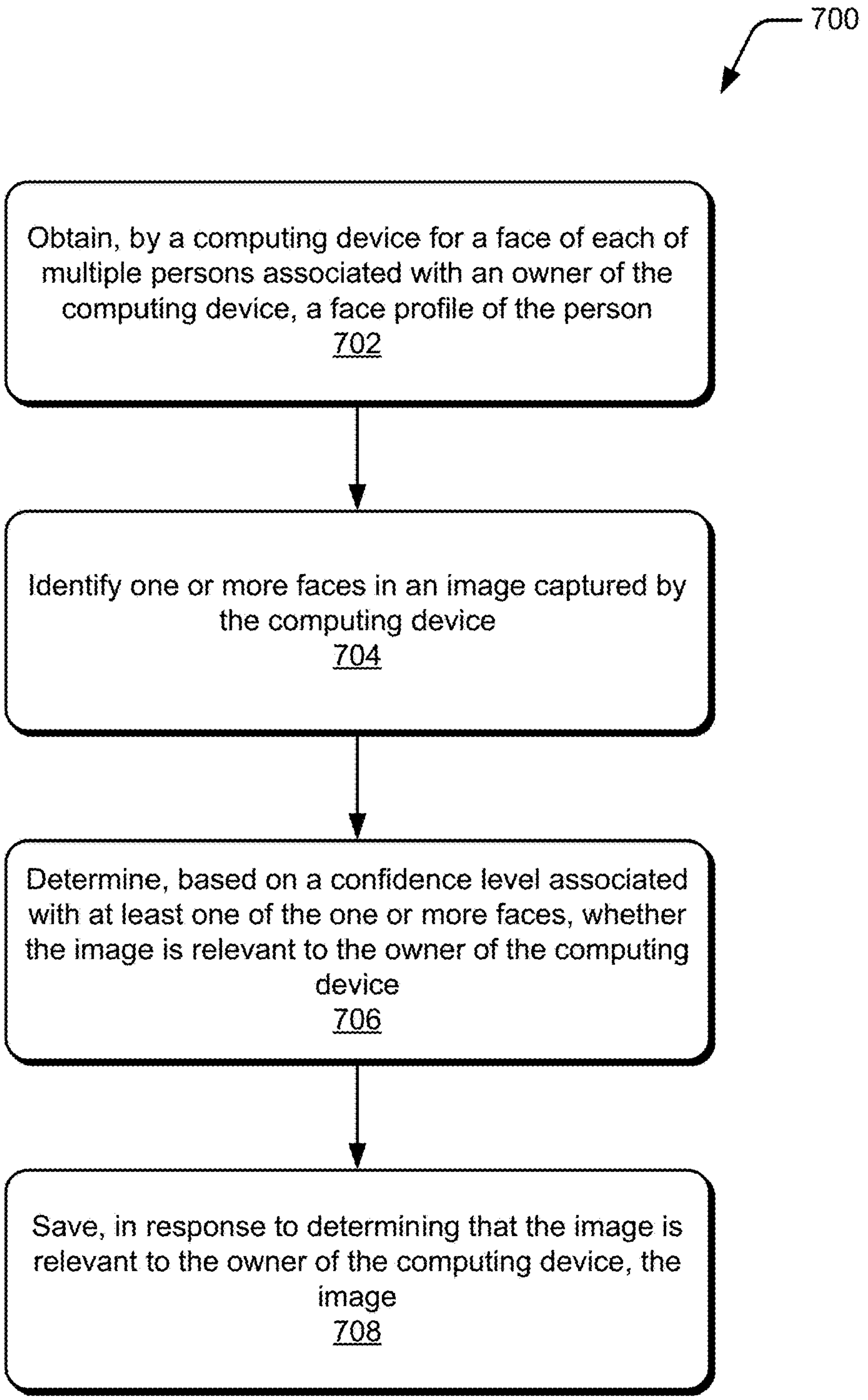

FIG. 7 illustrates an example process 700 for implementing the techniques discussed herein in accordance with one or more embodiments. Process 700 is carried out at least in part by an image relevance determination system, such as image relevance determination system 120 of FIG. 1 or FIG. 2.

In process 700, a computing device obtains, for a face of each of multiple persons associated with an owner of the computing device, a face profile of the person (act 702). The computing device may generate the face profile or receive the face profile from a remote service.

One or more faces in an image captured by the computing device are identified (act 704). The image can be captured by another user of the computing device other than the owner of the computing device, such as a friend or family member of the owner of the computing device.

A determination is made, based on a confidence level associated with at least one of the one or more faces, whether the image is relevant to the owner of the computing device (act 706).

The image is saved in response to determining that the image is relevant to the owner of the computing device (act 708). The image may be saved in various locations, such as locally at the computing device, at a remote server (e.g., in the cloud), and so forth.

Figure 8:
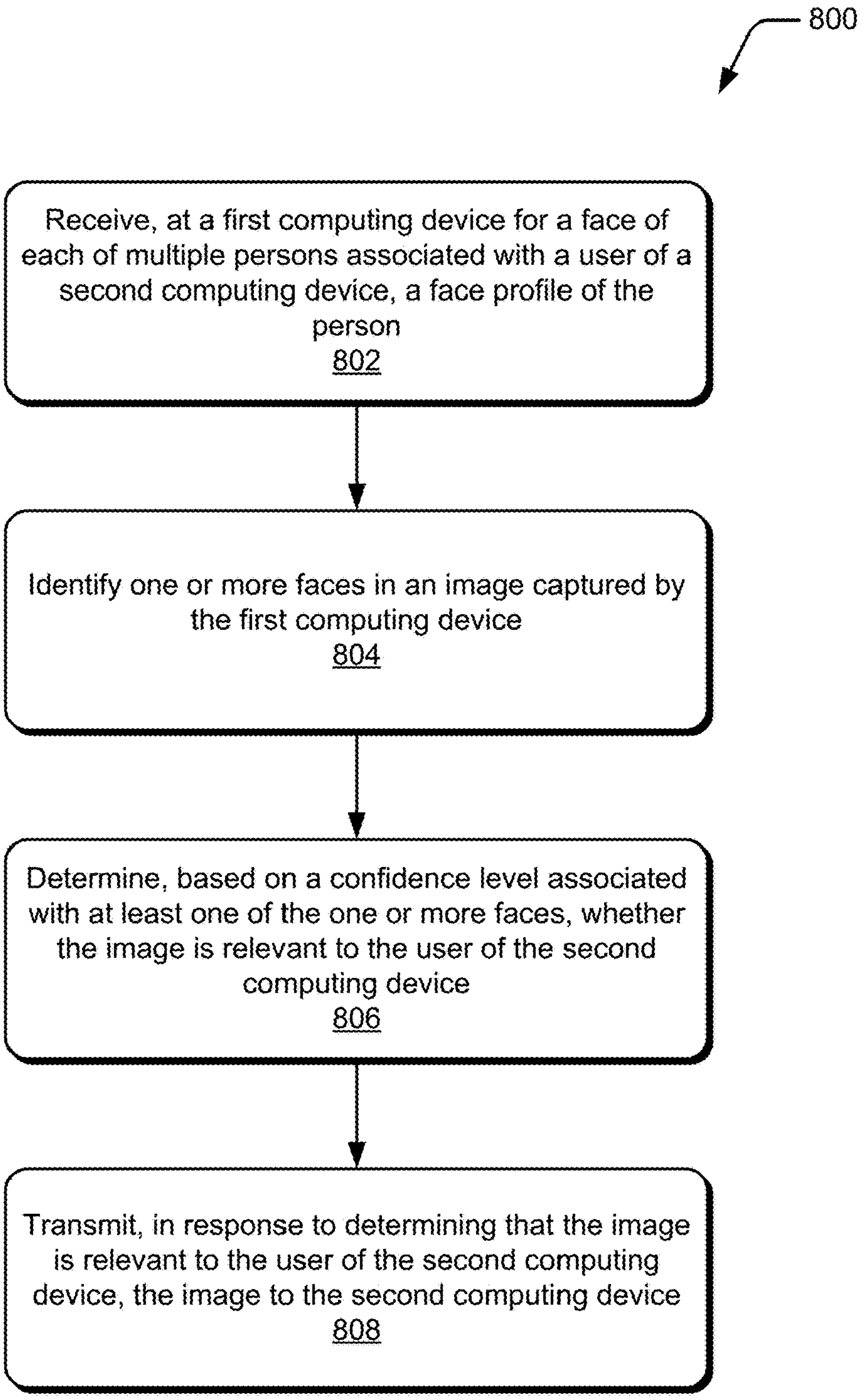

FIG. 8 illustrates an example process 800 for implementing the techniques discussed herein in accordance with one or more embodiments. Process 800 is carried out at least in part by an image relevance determination system, such as image relevance determination system 120 of FIG. 1 or FIG. 2.

In process 800, a first computing device receives, for a face of each of multiple persons associated with a user of a second computing device, a face profile of the person (act 802).

One or more faces in an image captured by the first computing device are identified (act 804).

A determination is made, based on a confidence level associated with at least one of the one or more faces, whether the image is relevant to the user of the second computing device (act 806).

In response to determining that the image is relevant to the user of the second computing device, the first computing device transmits the image to the second computing device (act 808).

Figure 9:
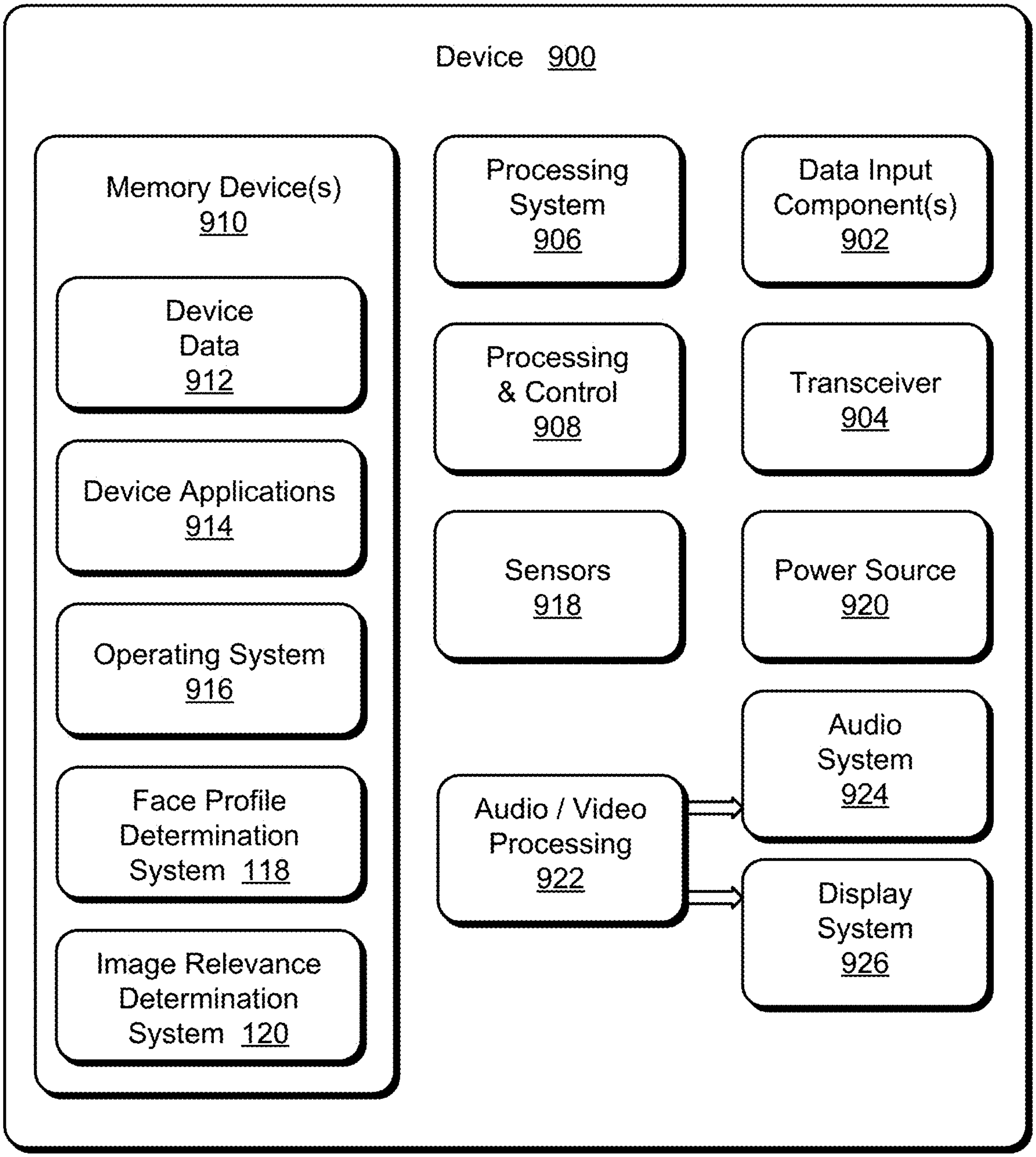
FIG. 9 illustrates various components of an example electronic device that can implement embodiments of the techniques discussed herein.

FIG. 9 illustrates various components of an example electronic device that can implement embodiments of the techniques discussed herein. The electronic device 900 can be implemented as any of the devices described with reference to the previous FIGS., such as any type of client device, mobile phone, tablet, computing, communication, entertainment, gaming, media playback, or other type of electronic device. In one or more embodiments the electronic device 900 includes one or both of the face profile determination system 118 and the image relevance determination system 120, described above.

The electronic device 900 includes one or more data input components 902 via which any type of data, media content, or inputs can be received such as user-selectable inputs, messages, music, television content, recorded video content, and any other type of text, audio, video, or image data received from any content or data source. The data input components 902 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 902 may also include various other input components such as microphones, touch sensors, touchscreens, keyboards, and so forth.

The device 900 includes communication transceivers 904 that enable one or both of wired and wireless communication of device data with other devices. The device data can include any type of text, audio, video, image data, or combinations thereof. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, wired local area network (LAN) Ethernet transceivers for network data communication, and cellular networks (e.g., third generation networks, fourth generation networks such as LTE networks, or fifth generation networks).

The device 900 includes a processing system 906 of one or more processors (e.g., any of microprocessors, controllers, and the like) or a processor and memory system implemented as a system-on-chip (SoC) that processes computer-executable instructions. The processing system 906 may be implemented at least partially in hardware, which can include components of an integrated circuit or on-chip system, an application-specific integrated circuit (ASIC), a field-programmable gate array (FPGA), a complex programmable logic device (CPLD), and other implementations in silicon or other hardware.

Alternately or in addition, the device can be implemented with any one or combination of software, hardware, firmware, or fixed logic circuitry that is implemented in connection with processing and control circuits, which are generally identified at 908. The device 900 may further include any type of a system bus or other data and command transfer system that couples the various components within the device. A system bus can include any one or combination of different bus structures and architectures, as well as control and data lines.

The device 900 also includes computer-readable storage memory devices 910 that enable one or both of data and instruction storage thereon, such as data storage devices that can be accessed by a computing device, and that provide persistent storage of data and executable instructions (e.g., software applications, programs, functions, and the like). Examples of the computer-readable storage memory devices 910 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 900 may also include a mass storage media device.

The computer-readable storage memory device 910 provides data storage mechanisms to store the device data 912, other types of information or data, and various device applications 914 (e.g., software applications). For example, an operating system 916 can be maintained as software instructions with a memory device and executed by the processing system 906 to cause the processing system 906 to perform various acts. The device applications 914 may also include a device manager, such as any form of a control application, software application, signal-processing and control module, code that is native to a particular device, a hardware abstraction layer for a particular device, and so on.

The device 900 can also include one or more device sensors 918, such as any one or more of an ambient light sensor, a proximity sensor, a touch sensor, an infrared (IR) sensor, accelerometer, gyroscope, thermal sensor, audio sensor (e.g., microphone), and the like. The device 900 can also include one or more power sources 920, such as when the device 900 is implemented as a mobile device. The power sources 920 may include a charging or power system, and can be implemented as a flexible strip battery, a rechargeable battery, a charged super-capacitor, or any other type of active or passive power source.

The device 900 additionally includes an audio or video processing system 922 that generates one or both of audio data for an audio system 924 and display data for a display system 926. In accordance with some embodiments, the audio/video processing system 922 is configured to receive call audio data from the transceiver 904 and communicate the call audio data to the audio system 924 for playback at the device 900. The audio system or the display system may include any devices that process, display, or otherwise render audio, video, display, or image data. Display data and audio signals can be communicated to an audio component or to a display component, respectively, via an RF (radio frequency) link, S-video link, HDMI (high-definition multimedia interface), composite video link, component video link, DVI (digital video interface), analog audio connection, or other similar communication link. In implementations, the audio system or the display system are integrated components of the example device. Alternatively, the audio system or the display system are external, peripheral components to the example device.

Although embodiments of techniques for identifying relevant faces in images for a user have been described in language specific to features or methods, the subject of the appended claims is not necessarily limited to the specific features or methods described. Rather, the specific features and methods are disclosed as example implementations of techniques for implementing identifying relevant faces in images for a user. Further, various different embodiments are described, and it is to be appreciated that each described embodiment can be implemented independently or in connection with one or more other described embodiments. Additional aspects of the techniques, features, and/or methods discussed herein relate to one or more of the following:

In some aspects, the techniques described herein relate to a method including: obtaining, by a first computing device for a face of each of multiple persons associated with a user, a face profile of the person: identifying one or more faces in an image captured by the first computing device: determining, based on a confidence level associated with at least one of the one or more faces, whether the image is relevant to the user: taking, in response to determining that the image is relevant to the user, one or more actions to keep the image.

In some aspects, the techniques described herein relate to a method, wherein the one or more actions include saving the image in a local storage device of the computing device.

In some aspects, the techniques described herein relate to a method, wherein the one or more actions include transmitting the image to a remote storage associated with the user.

In some aspects, the techniques described herein relate to a method, wherein the user is a user of the computing device.

In some aspects, the techniques described herein relate to a method, wherein the user is a person other than an owner of the computing device.

In some aspects, the techniques described herein relate to a method, wherein the face profile for a person identifies the face of the person and includes a confidence level that the face is a relevant face for the user.

In some aspects, the techniques described herein relate to a method, wherein the obtaining includes extracting, by the computing device, the face profile from face data accessible to the computing device.

In some aspects, the techniques described herein relate to a method, wherein the face data includes images of people included in a contacts list of the computing device or in one or more social media services accessible to the computing device.

In some aspects, the techniques described herein relate to a method, wherein a face that appears multiple times in one or more social media services accessible to the device or in a contacts list of the computing device has a higher confidence level than faces that appear a single time in the one or more social media services accessible to the device or in the contacts list of the computing device.

In some aspects, the techniques described herein relate to a method, wherein the obtaining includes receiving the face profiles of the multiple persons from a second computing device, and wherein the user is a user of the second computing device.

In some aspects, the techniques described herein relate to a method, wherein the one or more actions include transmitting the image to the second computing device.

In some aspects, the techniques described herein relate to a method, wherein the one or more actions comprise displaying, on a display device of the computing device, an indication of one or more of the faces having a confidence level above a threshold value.

In some aspects, the techniques described herein relate to a method, further including deleting the image in response to determining that the image is not relevant to the user.

In some aspects, the techniques described herein relate to a computing device including: a processor implemented in hardware; and a computer-readable storage medium having stored thereon multiple instructions that, responsive to execution by the processor, cause the processor to perform acts including: obtaining, by a first computing device for a face of each of multiple persons associated with a user, a face profile of the person; identifying one or more faces in an image captured by the first computing device; determining, based on a confidence level associated with at least one of the one or more faces, whether the image is relevant to the user; taking, in response to determining that the image is relevant to the user, one or more actions to keep the image.

In some aspects, the techniques described herein relate to a computing device, wherein the one or more actions include saving the image in a local storage device of the computing device.

In some aspects, the techniques described herein relate to a computing device, wherein the one or more actions include transmitting the image to a remote storage associated with the user.

In some aspects, the techniques described herein relate to a computing device, wherein the obtaining includes receiving the face profiles of the multiple persons from a second computing device, wherein the user is a user of the second computing device, and wherein the one or more actions include transmitting the image to the second computing device.

In some aspects, the techniques described herein relate to a computing device, the acts further including deleting the image in response to determining that the image is not relevant to the user.

In some aspects, the techniques described herein relate to a first computing device including: an image relevance determination system, implemented at least in part in hardware, to obtain, for a face of each of multiple persons associated with a user, a face profile of the person, identify one or more faces in an image captured by the first computing device, and determine, based on a confidence level associated with at least one of the one or more faces, whether the image is relevant to the user; and an application to take, in response to determining that the image is relevant to the user, one or more actions to keep the image.

In some aspects, the techniques described herein relate to a computing device, wherein the one or more actions include saving the image in a local storage device of the computing device.

In some aspects, the techniques described herein relate to a computing device, wherein the one or more actions include transmitting the image to a remote storage associated with the user.

In some aspects, the techniques described herein relate to a computing device, wherein to obtain the face profiles is to receive the face profiles of the multiple persons from a second computing device, wherein the user is a user of the second computing device, and wherein the one or more actions include transmitting the image to the second computing device.

What is claimed is:

1. A method comprising:

obtaining, by a first computing device for a face of each of multiple persons associated with a first user, a face profile of the person;

capturing, by the first computing device, an image when a second user is using the first computing device, the second user being different than the first user;

identifying one or more faces of one or more persons in the image;

determining, based on a confidence level associated with at least one of the one or more faces, whether the image is relevant to the first user, the confidence level associated with a face indicating how important a person associated with the face is to the first user; and automatically taking, in response to determining that the image is relevant to the first user, one or more actions to keep the image.

2. The method of claim 1, wherein the one or more actions comprise saving the image in a local storage device of the first computing device.

3. The method of claim 1, wherein the one or more actions comprise transmitting the image to a remote storage associated with the first user.

4. The method of claim 1, wherein the first user is an owner of the first computing device and the second user is a person other than the owner of the first computing device.

5. The method of claim 1, wherein the face profile for a person identifies the face of the person and includes a confidence level that the face is a relevant face for the first user.

6. The method of claim 5, wherein the obtaining comprises extracting, by the first computing device, the face profile from face data accessible to the first computing device.

7. The method of claim 6, wherein the face data includes images of people included in a contacts list of the first computing device or in one or more social media services accessible to the first computing device.

8. The method of claim 5, wherein a face that appears multiple times in one or more social media services accessible to the first device or in a contacts list of the first computing device has a higher confidence level than faces that appear a single time in the one or more social media services accessible to the first computing device or in the contacts list of the first computing device.

9. The method of claim 1, further comprising automatically deleting the image in response to determining that the image is not relevant to the first user.

10. A first computing device comprising:

an image capture system; and at least one processor, coupled with the image capture system, configured to cause the first computing device to:

obtain, for a face of each of multiple persons associated with a user of a second computing device, a face profile of the person;

capture, by the image capture system, an image when a user of the first computing device is different than a user of the second computing device;

identify one or more faces in the image;

determine, based on a confidence level associated with at least one of the one or more faces, whether the image is relevant to the user of the second computing device, the confidence level associated with a face indicating how important a person associated with the face is to the user of the second computing device;

automatically transmit, in response to a determination that the image is relevant to the user of the second computing device, the image to the second computing device or to a remote storage associated with the user of the second computing device.

11. The first computing device of claim 10, wherein to obtain the face profiles of the multiple persons is to receive the face profiles of the multiple persons from the second computing device.

12. The computing device of claim 10, wherein the at least one processor is further configured to cause the first computing device to delete the image in response to determining that the image is not relevant to the user.

13. A first computing device comprising:

an image capture system; and at least one processor, coupled with the image capture system, configured to cause the first computing device to:

obtain, for a face of each of multiple persons associated with a first user, a face profile of the person;

capture an image when a second user is using the first computing device, the second user being different than the first user;

identify one or more faces of one or more persons in the image;

determine, based on a confidence level associated with at least one of the one or more faces, whether the image is relevant to the first user, the confidence level associated with a face indicating how important a person associated with the face is to the first user; and automatically take, in response to determining that the image is relevant to the first user, one or more actions to keep the image.

14. The first computing device of claim 13, wherein the one or more actions comprise transmitting the image to a remote storage associated with the first user.

15. The first computing device of claim 13, wherein to obtain the face profiles is to receive the face profiles of the multiple persons from the second computing device, and wherein the one or more actions comprise transmitting the image to the second computing device.

16. The first computing device of claim 13, wherein the face profile for a person identifies the face of the person and includes a confidence level that the face is a relevant face for the first user.

17. The first computing device of claim 10, wherein the face profile for a person identifies the face of the person and includes a confidence level that the face is a relevant face for the first user.

18. The first computing device of claim 10, wherein the first computing device further comprises a viewfinder and the at least one processor is further configured to cause the first computing device to display, on the viewfinder before capture of the image, a preview screen that includes the confidence level.

19. The first computing device of claim 10, wherein the at least one processor is further configured to cause the first computing device to provide no indication to the user of the first computing device that the image was transmitted to the second computing device.

20. The method of claim 1, wherein determining whether the image is relevant to the first user comprises determining whether the image is relevant to the first user based on confidence levels associated with each of multiple faces of the one or more faces.

* * * * *